United States Patent [19]

Kurata et al.

[11] 4,447,818
[45] May 8, 1984

[54] MULTICOLOR HEAT-SENSITIVE RECORDING APPARATUS

[75] Inventors: Masami Kurata; Fujio Moriguchi, both of Kanagawa, Japan

[73] Assignee: Fuji Xerox Co., Ltd., Tokyo, Japan

[21] Appl. No.: 349,551

[22] Filed: Feb. 17, 1982

[30] Foreign Application Priority Data

Feb. 20, 1981 [JP] Japan .................................. 56-23137

[51] Int. Cl.³ ...................... G01D 15/10; G01D 9/28; B41J 3/02
[52] U.S. Cl. ................................ 346/76 PH; 346/46; 400/120
[58] Field of Search ..................... 346/46, 76; 400/120; 219/216 PH; 355/4

[56] References Cited

U.S. PATENT DOCUMENTS 4,250,511 2/1981 Stein et al. ........................ 346/46 X
4,371,253 2/1983 Day et al. ................................ 355/4

FOREIGN PATENT DOCUMENTS 56-151578 11/1981 Japan .................................. 400/120

OTHER PUBLICATIONS

I.B.M. Technical Disclosure Bulletin, vol. 23, No. 7A, Dec. 1980, p. 2954.

*Primary Examiner*—Donald A. Griffin
*Attorney, Agent, or Firm*—Sughrue, Mion, Zinn, Macpeak and Seas

[57] ABSTRACT

A multicolor recording apparatus is provided with plural recording stations for recording in a like number of colors. A single sheet transport path extends through all of the stations, such that recording may be carried out in all colors. A number of sheet supply stations are provided at different points along the transport path, so that recording may take place in one, several or all of the available colors.

5 Claims, 1 Drawing Figure

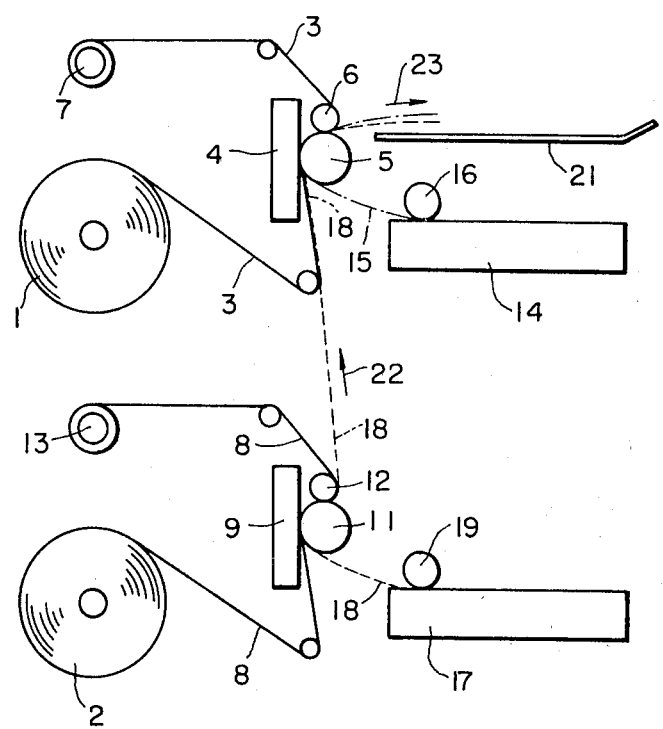

MULTICOLOR HEAT-SENSITIVE RECORDING APPARATUS

BACKGROUND OF THE INVENTION

This invention relates to a transfer type multicolor heat-sensitive recording apparatus using a plurality of different donor sheet supply rolls, and more particularly to a multicolor heat-sensitive recording apparatus in which the sheet supplying route can be changed according to the number of donor sheet supply rolls which are to be used.

In a heat-sensitive recording apparatus using a donor sheet supply roll (hereinafter referred to merely as "a supply sheet"), a recording sheet (or an ordinary sheet) is placed on an ink donor sheet supplied from a supply roll, so that these sheets are selectively heated by the thermal head. Thermally melting or sublimating ink coated on the ink donor sheet is melted or sublimated according to image data, so as to be transferred onto the recording sheet. Thus, the image data are recorded on the recording sheet.

A multicolor heat-sensitive recording apparatus for multicolor recording has a plurality of supply rolls, the number of which is equal to the number of colors to be used. A recording sheet is placed on the ink donor sheets supplied from the supply rolls one after another. Whenever the recording sheet is placed on any one of the ink donor sheets, a thermal transfer recording process is effected, so that the image data may be recorded in many colors.

In general, a multicolor heat-sensitive recording apparatus has the capability of selecting the number of recording colors, according to a given original. A multicolor heat-sensitive recording apparatus, which can use two colors, for instance red and black, for recording, can record an image in black only or in red and black. In order to select the number of recording colors, a conventional multicolor heat-sensitive recording apparatus employs one of the following recording systems:

(1) A first recording system in which, in the recording operation, ink donor sheets are supplied from all supply rolls, and a recording sheet is placed on the ink donor sheets in a predetermined order, while only those thermal heads corresponding to recording colors to be used are operated.

(2) A second recording system in which, in a recording operation, ink donor sheets are supplied only from those supply rolls corresponding to selected recording colors, a recording sheet conveying route being changed according to the number of selected colors so that the recording sheet is placed on these ink donor sheets only, and data are recorded by thermal transfer.

However, the first recording system suffers from the problem that, in the case where monochromatic recording is desired for recording data in black, for instance, the ink donor sheet for red recording is uneconomically wasted. On the other hand, the second recording system is disadvantageous in that, since it requires a switching mechanism for changing the recording sheet conveying route, the recording apparatus is unavoidably intricate in construction and high in manufacturing cost.

SUMMARY OF THE INVENTION

In view of the foregoing, an object of this invention is to provide a multicolor heat-sensitive recording apparatus in which the provision of a switching mechanism for changing the recording sheet conveying path is unnecessary, and in which the uneconomical use of ink donor sheets is prevented.

The foregoing object of the invention has been achieved by the provision of a multicolor heat-sensitive recording apparatus in which a plurality of sheet supplying means are provided so that a recording sheet can be supplied for a desired one of a series of multicolor heat-sensitive recording processes, the recording sheet being supplied from one of the sheet supplying means according to the number of recording colors which are to be used in the recording operation.

BRIEF DESCRIPTION OF THE DRAWING

The single FIGURE in the accompanying drawing is an explanatory diagram illustrating an arrangement of a multicolor heat-sensitive recording apparatus according to one embodiment of the invention.

DETAILED DESCRIPTION OF THE PREFERRED EMBODIMENT

The single FIGURE in the accompanying drawing shows a multicolor heat-sensitive recording apparatus which records data in two colors, namely, black and red. The apparatus has a "black" supply roll 1 for recording data in black, and a "red" supply roll 2 for recording data in red. A "black" ink donor sheet 3 is supplied by the "black" supply roll 1. The sheet 3 thus supplied is run through the gap between a "black" thermal head 4 and a back roll 5, and the gap between the back roll 5 and a drive roll 5, and is then wound on a "black" winding roll 7. Similarly, a "red" ink donor sheet 8 supplied by the "red" supply roll 2 is run through the gaps between a "red" thermal head 9 and a back roll 11, and between the back roll 11 and a drive roll 12, and is then wound on a "red" winding roll 13.

A paper tray 14 for monochromatic recording is disposed near the back roll 5. The paper tray 14 is provided with a feed roll 16 which operates to feed recording sheets 15, one after another. Similarly, a paper tray 17 for two-color recording is disposed near the back roll 11. The paper tray 17 is provided with a feed roll 19 which operates to feed recording sheets 18, which are equal in size to the aforementioned recording sheets, one at a time. A discharge tray 21 is provided near the back roll 5, in order to discharge the recorded sheets.

The operation of the multicolor heat-sensitive recording apparatus will be described with reference to the case where data are to be recorded in two colors. When the operator depresses a two-color printing button (not shown), the feed roll 19 is driven, so that the recording sheet 18 is moved along a path indicated by the dotted line to enter the gap between the "red" thermal head 9 and the back roll 11. At the same time, the drive roll 12 and the winding roll 13 are driven, and the back roll 11 is turned, following the rolls 12 and 13, whereby the red ink donor sheet 8 is supplied from the supply roll 2. With this timing, a driving circuit (not shown) will start supplying an image signal for recording data in red to the thermal head 9, so that data are recorded in red on the recording sheet 18, which is conveyed while abutting the red ink donor sheet 8.

After recording has been accomplished, the recording sheet 18 is peeled off the red ink donor sheet 8 and is then conveyed in the direction of arrow 22. The recording sheet 18 is then inserted between the "black" thermal head 4 and the back roll 5. At the same time, the drive roll 6 and the winding roll 7 are driven, and the "black" back roll 5 is turned following the rolls 6 and 7, whereby the black ink donor sheet 3 is supplied from the supply roll 1. With this timing, a drive circuit (not shown) starts to supply an image signal for recording data in black to the thermal head 4 with a predetermined delay time, so that data are recorded in black on the recording sheet 18, which is conveyed while abutting the black ink donor sheet 3.

When data has been recorded in the two colors, the recording sheet 18 is peeled off the black ink donor sheet 3, and is then conveyed in the direction of the arrow 23, whereby the sheet is fed into the discharge tray 21.

The feeding of the ink donor sheet 3 (or 8) from the supply roll 1 (or 2) is stopped when, after the data have been recorded in the respective color, the recording sheet 18 is peeled off the respective ink donor sheet.

The operation of the apparatus will now be described with reference to the case where data are to be recorded in only a single color. In the case where a recording apparatus capable of carrying out two-color printing is used to perform monochromatic recording, the data are, in general, recorded in black. When the operator depresses the monochromatic recording button (not shown), the feed roll 16 is driven, so that the recording sheet 15 is advanced along the path indicated by the dot chain line and is inserted between the "black" thermal head 4 and the back roll 5. At the same time, similarly as in the second half of the two-color recording process described above, the black ink donor sheet 3 is run, so that data are recorded on the recording sheet 15 in black. After the data have been recorded, the recording sheet 15 is peeled off the black ink donor sheet. The recording sheet 15 thus peeled off is conveyed in the direction of the arrow 23 and is delivered to the discharge tray 21.

In this operation, the recording sheet 15 does not go through the "red" thermal head 9, and the red ink donor sheet 8 is not supplied from the supply roll 2. Of course, it is unnecessary to supply the sheet 8 from the roll 2.

As is apparent from the above description, according to the invention, it is unnecessary to provide switching mechanisms for changing the direction of advance of the recording sheet, and thus the sheet conveying path is simplified. Therefore, the present multicolor heat-sensitive recording apparatus is advantageous in that it is free from jamming problems and the like.

While the above embodiment has been described with reference to the case where data are printed in only two colors, it will be readily understood that the technical concept of the invention is also applicable to the case where data are printed in more than two colors.

What is claimed is:

1. A multicolor heat-sensitive recording apparatus, comprising:
    a multicolor recording unit having a plurality of different recording sections for respectively recording data in different colors by thermal transfer, and being arranged in series in correspondence to said different colors, each of said recording sections having a thermal head and a donor sheet supply roll for supplying an ink donor sheet to said thermal head;
    a single sheet conveying path for supplying recording sheets to said recording sections in said multicolor recording unit in a predetermined order, to allow said recording sections to carry out recording operations by thermal transfer; and
    sheet supplying means for supplying recording sheets to at least one mid point of said sheet conveying path so that data are recorded in at least one but less than all of said different colors.

2. The recording apparatus of claim 1, further comprising further sheet supplying means for supplying recording sheets to a start point of said sheet conveying path so that data is recorded in all of said different colors.

3. The recording apparatus of claim 2, further including sheet output means arranged only after a last of said series of recording sections.

4. The recording apparatus of claims 1 or 2, wherein a last of said series of recording sections records in black, whereby recording in black may be effected without actuating others of said recording sections.

5. A multicolor recording device, comprising:
    a plurality of recording sections arranged in series, each recording section recording data in a different color;
    a sheet conveying path passing from a first sheet supplying means through all of said recording sections, to allow data to be recorded in all of said different colors;
    at least one alternate sheet supply means for supplying sheets to a mid point of said sheet conveying path, to allow data to be recorded in less than all of said colors.

* * * * *